(12) United States Patent
Dietz et al.

(10) Patent No.: US 6,582,508 B2
(45) Date of Patent: Jun. 24, 2003

(54) PROCESS FOR FINE DIVISION OF ORGANIC PIGMENTS

(75) Inventors: Erwin Dietz, Königstein (DE); Joachim Weber, Frankfurt am Main (DE); Dieter Schnaitmann, Eppstein (DE); Christian Wille, Weinheim (DE); Leonhard Unverdorben, Nidderau (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/972,082

(22) Filed: Oct. 5, 2001

(65) Prior Publication Data

US 2002/0040663 A1 Apr. 11, 2002

(30) Foreign Application Priority Data

Oct. 5, 2000 (DE) .......................................... 100 49 199

(51) Int. Cl.[7] .......................... C09B 67/04; C09B 67/00; C09B 67/20
(52) U.S. Cl. ...................... 106/493; 106/412; 106/494; 106/495; 106/496; 106/497; 106/498; 241/5; 241/15; 241/18; 241/24.1
(58) Field of Search ............................... 106/412, 493, 106/494, 495, 496, 497, 498; 241/5, 15, 18, 24.1

(56) References Cited

U.S. PATENT DOCUMENTS

| | | | |
|---|---|---|---|
| 3,607,336 A | 9/1971 | Jaffe ........................... | 106/495 |
| 4,253,839 A | 3/1981 | Spietschka et al. .......... | 106/498 |
| 5,296,033 A | 3/1994 | Dietz et al. .................. | 106/412 |
| 5,614,014 A | 3/1997 | Urban ......................... | 106/495 |
| 5,626,662 A | 5/1997 | Urban ......................... | 106/497 |
| 5,919,299 A | 7/1999 | Kilmurray et al. ........... | 106/497 |
| 6,013,126 A | 1/2000 | Shannon et al. ............. | 106/493 |
| 6,340,387 B1 | 1/2002 | Orth-Gerber et al. ....... | 106/447 |

FOREIGN PATENT DOCUMENTS

| | | |
|---|---|---|
| DE | 27 42 575 | 2/1979 |
| DE | 199 10 521 | 9/2000 |
| EP | 0 574 790 | 12/1993 |
| EP | 0 666 288 | 8/1995 |
| EP | 0 678 559 | 10/1995 |
| WO | 00/44673 | 8/2000 |

OTHER PUBLICATIONS

EPO Search Report for EP application No. 01122053, mail date Jan. 22, 2002.
Abstract XP–002186544, "New non–clogging microreactor for chemical processing and nano materials", The Institution of Electrical Engineers, Sep. 27, 2000.
Abstract XP–002186545, for SU Patent No. 467159, Jul. 31, 1975.
U.S. application Ser. No. 09/971,495, filed Oct. 5, 2001, Dietz, et al.
U.S. application Ser. No. 09/971,496, filed Oct. 5, 2001, Dietz, et al.
U.S. application Ser. No. 09/972,102, filed Oct. 5, 2001, Dietz, et al.
U.S. application Ser. No. 09/780,218, filed Feb. 9, 2001, Nickel, et al.*
U.S. application Ser. No. 09/892,588, filed Jun. 27, 2001, Nickel, et al.*

* cited by examiner

*Primary Examiner*—Anthony J. Green
(74) *Attorney, Agent, or Firm*—Anthony A. Bisulca

(57) ABSTRACT

The invention provides a process for the fine division of pigments which comprises spraying a coarsely crystalline crude pigment and/or a poorly dispersible prepigment in suspension form through nozzles to a point of conjoint collision in a reactor chamber enclosed by a housing in a microjet reactor, a gas or an evaporating liquid being passed into the reactor chamber through an opening in the housing for the purpose of maintaining a gas atmosphere in the reactor chamber, and the resulting pigment suspension and the gas or the evaporated liquid being removed from the reactor through a further opening in the housing by means of overpressure on the gas entry side or underpressure on the product and gas exit side.

18 Claims, No Drawings

PROCESS FOR FINE DIVISION OF ORGANIC PIGMENTS

BACKGROUND OF THE INVENTION

The present invention describes an environment-friendly and economic process for fine division of organic pigments.

Organic pigments have been known for a long time and have acquired great industrial importance for pigmenting high molecular mass organic materials such as paints, plastics or printing inks. At the synthesis stage, the pigments are often obtained in the form of coarsely crystalline crude pigments which at that stage do not meet the technical requirements. They must first be subjected to a process of fine division which brings about a reduction in particle size. This is commonly followed by a heat treatment, in order to obtain pigments meeting the technical requirements, as described for example in DE-A-27 42 575, or pigmentary dispersants or other additives are used in order to achieve specific effects, as described for example in EP-A-0 666 288 or in EP-A0 574 790.

In order to convert a crude pigment into the pigment or prepigment form, a variety of fine division processes are known, examples being acid pasting (reprecipitation from solvents, particularly acids), salt kneading, dry grinding, and wet grinding processes. Combinations of these techniques are also described. U.S. Pat. No. 3,607,336 describes an acid pasting process for fine division, in which the pigment is dissolved in sulfuric acid and precipitated in turbulent flow. The process is accompanied by the production of large amounts of dilute acid, which must either be emitted into the wastewater or regenerated at expense.

DE-A-27 42 575 describes a process of fine division by dry grinding without salt; as in the case of any dry grinding process, the environment is burdened by the dust and noise produced. Mill vibrations have to be damped by means of complex constructional measures.

U.S. Pat. No. 5,919,299 describes a combination of dry grinding in the presence of salt with subsequent acid swelling. The described advantage of the reduced amount of salt at the dry grinding stage necessitates the second step of acid swelling, in the course of which large amounts of acid are produced, which together with the still considerable amounts of salt must be emitted into the wastewater or recovered at expense, and so make the process uneconomic.

EP-A-0 678 559 describes a fine division process without the use of salt. This advantage comes, however, at the expense of a two-stage process, namely a combination of dry and wet grinding. As a result, the process becomes time-consuming, cost-intensive and hence uneconomic. In the case of the wet grinding process, the use of grinding media leads inevitably to abrasion and thus to the incorporation of extraneous substances into the product.

U.S. Pat. No. 6,013,126 describes a salt kneading process in the presence of fatty acids. In the course of the salt kneading, large amounts of salt and solvents are obtained which either burden the environment or have to be recovered, at expense.

With the mechanical fine division processes known to date, the largest part of the energy is converted into heat and only a fraction of the energy introduced is used effectively for grinding. When grinding media such as beads are used, abrasion occurs and thus the product is contaminated by extraneous substances. The scaleup of new products from the laboratory to the industrial scale is often complicated and may cause difficulties, since the introduction of the mechanical energy, the transmission of the energy for effective grinding, the energy lost through heat production, and the necessary heat dissipation, for example, depend greatly on the geometries and sizes of the apparatus, and so are also factors codetermining the economics of the process at the industrial scale.

SUMMARY OF THE INVENTION

It was an object of the present invention to develop a universally applicable, cost-effective, technically reliable, and economic process for fine division of organic pigments, said process being combinable if desired with the measures known in connection with the preparation of pigments, such as the use of solvents, pigmentary and nonpigmentary dispersants, or other auxiliaries; permitting unproblematic scaleup; and removing the possibility of contamination by extraneous substances.

It has been found that the object of the invention may be achieved, surprisingly, through the use of a microjet reactor.

The present invention provides a process for the fine division of pigments which comprises spraying a coarsely crystalline crude pigment and/or a poorly dispersible prepigment in suspension form through nozzles to a point of conjoint collision in a reactor chamber enclosed by a housing in a microjet reactor, appropriately via one or more pumps, preferably high-pressure pumps, a gas or an evaporating liquid being passed into the reactor chamber through an opening in the housing for the purpose of maintaining a gas atmosphere in the reactor chamber, especially at the point of collision of the suspension jets, and where appropriate of effecting cooling as well, and the resulting pigment suspension and the gas or the evaporated liquid being removed from the reactor through a further opening in the housing by means of overpressure on the gas entry side or underpressure on the product and gas exit side.

DESCRIPTION OF THE PREFERRED EMBODIMENTS

Pigment fine division in accordance with the invention requires a high grinding and dispersing action. This is brought about by spraying the suspensions used into the reactor chamber under a pressure of at least 50 bar, preferably at least 500 bar, in particular from 500 to 5000 bar.

In order to prevent material wear on the inner surfaces of the housing, the collision point is shifted into the material-remote gas space. By "material-remote" here is meant that, in the vicinity of the collision point of the jets, a gas atmosphere is maintained by means of the introduced gas or evaporating liquid. This means that the collision point at which the jets impinge on one another is not sited on a vessel wall or on a pipe wall. This prevents the material wear that would occur at the point where cavitation takes place on material walls. Cavitation occurs particularly when using high pressures, especially at pressures above 3000 bar. Moreover, the colliding jets are not braked by the gas atmosphere prior to their collision, as would be the case, for example, if they had to pass through a liquid.

The material of the nozzles should be as hard and thus low-wearing as possible; examples of suitable materials include ceramics, such as oxides, carbides, nitrides or mixed compounds thereof, with preference being given to the use of aluminum oxide, particularly in the form of sapphire or ruby, although diamond is also particularly suitable. Suitable hard substances also include metals, especially hardened metals. The bores of the nozzles have diameters of less than 2 mm, preferably less than 0.5 mm and in particular less than 0.4 mm.

The microjet reactor may in principle be configured as a two-jet, three-jet or multijet reactor, preference being given to a two-jet configuration. In the case of an arrangement with two jets, the jets preferably strike one another frontally (180° angle between the jets); in the case of a three-jet arrangement, an angle of 120° between the jets is appropriate. The jets advantageously may be mounted in a device which can be adjusted to the point of conjoint collision.

In one particularly preferred embodiment of the process of the invention, the suspension jets are sprayed against one another frontally through two opposed nozzles by means of a high-pressure pump.

The temperatures of the supplied suspensions are situated appropriately in the range from −50 to +250° C., preferably between 0 and 180° C., particularly from 0 to 100° C., especially between 10 and 80° C. It is also possible to operate under pressure at above the boiling point of the liquid medium.

Where necessary, the introduced gas or the evaporating liquid that is used to maintain the gas atmosphere in the inside of the housing may be used for cooling. Additionally, an evaporating cooling liquid or a cooling gas may be introduced into the reactor chamber by way of an additional bore in the housing. The aggregate state of the cooling medium may be conditioned by temperature and/or pressure. The medium in question may comprise, for example, air, nitrogen, carbon dioxide or other, inert gases or liquids having an appropriate boiling point under increased pressure. It is possible here for the transition of the cooling medium from the liquid to the gaseous state to take place in the reactor itself by virtue of the fact that heat released in the course of grinding brings about the change in aggregate state. It is also possible for the evaporative cooling of an expanding gas to be utilized for cooling.

The housing enclosing the reactor chamber may also be constructed in such a way that it is thermostatable and may be used for cooling; or else the product may be cooled after it has exited the housing. The pressure in the reactor chamber may, for example, be set and maintained by means of a pressure maintenance valve, so that the gas used is present in the liquid or supercritical or subcritical state. Thus it is possible, for example, to utilize the evaporative cooling of a gas.

If operation is to take place at elevated temperature, the energy required for heating may be supplied prior to the emergence from the nozzles of the suspension—for example, in the supply lines—or by way of the thermostatable housing or the introduced gas. In principle, owing to the high pressures in the high-pressure lances, the chosen temperature may also be situated a considerable way above the boiling point of the liquid medium. Suitable liquid media therefore include those which, at the temperature of grinding in the interior of the housing under atmospheric pressure, are present as gases.

If the intensity of grinding is too low, the desired fine division is not achieved. If desired, therefore, the suspension may also be pumped through the microjet reactor in more than one pass. Grinding may also take place in circulation. The number of passes, or the duration of grinding in the case of circulation grinding, is dependent on the fineness requirements for the respective application field. Normally from 1 to 10, preferably from 1 to 7, in particular from 1 to 5, passes are sufficient.

The suspension consists of crude pigment or prepigment, the liquid medium, and auxiliaries where appropriate.

For grinding it is appropriate to use the coarsely crystalline crude pigments obtained in the course of their synthesis or their purification, mixtures of these crude pigments, pigment preparations of these crude pigments, surface-treated crude pigments or coarsely crystalline mixed-crystal crude pigments.

Examples of suitable prepigments and crude pigments include perylene, perinone, quinacridone, quinacridonequinone, anthraquinone, anthanthrone, benzimidazolone, disazo condensation, azo, indanthrone, phthalocyanine, triarylcarbonium, dioxazine, e.g., triphendioxazines, aminoanthraquinone, diketopyrrolopyrrole, indigo, thioindigo, thiazineindigo, isoindoline, isoindolinone, pyranthrone, isoviolanthrone, flavanthrone, anthrapyrimidine or carbon black pigments; mixed crystals or mixtures thereof, especially coarsely crystalline crude quinacridone pigments of the β or γ( phase, coarsely crystalline crude quinacridone mixed-crystal pigments, coarsely crystalline crude copper phthalocyanine pigments of the α or β phase, coarsely crystalline chlorinated copper phthalocyanines, coarsely crystalline crude dioxazine, perylene, indanthrone, perinone, quinacridonequinone, anthraquinone, aminoanthraquinone, and anthanthrone pigments.

Coarsely crystalline crude pigments are crude pigments which are only suitable for pigmenting organic materials after their particles have been reduced in size. In the majority of cases, these crude pigments have an average particle size $D_{50}$ of more than 1 μm.

It is also possible to use prepigments which have already undergone fine division but are highly agglomerated and therefore poorly dispersible, mixtures or pigment formulations of prepigments, mixed-crystal prepigments, or else mixtures of coarsely crystalline crude pigments and prepigments.

The liquid medium of the (crude-pigment/prepigment) suspension may be water, an organic solvent, or a mixture thereof.

Grinding may be conducted in arbitrary pH ranges, preferably in the alkaline or neutral range.

Examples of the liquid medium used include water, alcohols having from 1 to 10 carbon atoms, examples being methanol, ethanol, n-propanol, isopropanol, butanols, such as n-butanol, sec-butanol, and tert-butanol, pentanols, such as n-pentanol and 2-methyl-2-butanol, hexanols, such as 2-methyl-2-pentanol and 3-methyl-3-pentanol, 2-methyl-2-hexanol, 3-ethyl-3-pentanol, octanols, such as 2,4,4-trimethyl-2-pentanol, and cyclohexanol; or glycols, such as ethylene glycol, diethylene glycol, propylene glycol, dipropylene glycol, or glycerol; polyglycols, such as polyethylene glycols or polypropylene glycols; ethers, such as methyl isobutyl ether, tetrahydrofuran or dimethoxyethane; glycol ethers, such as monomethyl or monoethyl ethers of ethylene glycol or propylene glycol, diethylene glycol monomethyl ether, diethylene glycol monoethyl ether, butyl glycols or methoxybutanol; ketones, such as acetone, diethyl ketone, methyl isobutyl ketone, methyl ethyl ketone or cyclohexanone; aliphatic acid amides, such as formamide, dimethylformamide, N-methylacetamide or N,N-dimethylacetamide; urea derivatives, such as tetramethylurea; or cyclic carboxamides, such as N-methylpyrrolidone, valerolactam or caprolactam; esters, such as carboxylic acid $C_1$–$C_6$ alkyl esters, such as butyl formate, ethyl acetate or propyl propionate; or carboxylic acid $C_1$–$C_6$ glycol esters; or glycol ether acetates, such as 1-methoxy-2-propyl acetate; or phthalic or benzoic acid $C_1$–$C_6$ alkyl esters, such as ethyl benzoate; cyclic esters, such as caprolactone; nitriles, such as acetonitrile or benzonitrile; aliphatic or aromatic hydrocarbons, such as cyclohexane or benzene; or alkyl-, alkoxy-, nitro- or halo-substituted benzene, such as toluene, xylenes, ethylbenzene, anisole, nitrobenzene, chlorobenzene, o-dichlorobenzene, 1,2,4-trichlorobenzene or bromobenzene; or other substituted aromatics, such as benzoic acid or phenol; aromatic heterocycles, such as pyridine, morpholine, picoline or quinoline; and also hexamethylphosphoramide, 1,3-dimethyl-2-imidazolidinone, dimethyl sulfoxide, and sulfolane. Said solvents may also be used as mixtures.

Preferred organic solvents are alcohols of 1 to 6 carbon atoms, especially ethanol, propanols, butanols, pentanols; aliphatic carboxamides, particularly dimethylformamide or N,N-dimethylacetamide; cyclic carboxamides, particularly N-methylpyrrolidone; aromatic hydrocarbons, particularly toluene, xylenes or ethylbenzene; chlorinated aromatic hydrocarbons, particularly chlorobenzene and o-dichlorobenzene; and dimethyl sulfoxide.

Preference is also given to using water-miscible solvents as mixtures with water.

The pigment concentration in the suspension is dependent on the suspension rheology and should be situated at or below 30% by weight, generally from 3 to 25% by weight, preferably between 5 and 20% by weight. The only critical factor is that the suspension is still conveyable.

In addition to the liquid phase and the crude pigment or prepigment, the suspension may further comprise auxiliaries, such as surfactants, nonpigmentary and pigmentary dispersants, fillers, standardizers, resins, waxes, defoamers, antidust agents, extenders, shading colorants, preservatives, drying retardants, rheology control additives, wetting agents, antioxidants, UV absorbers, light stabilizers, or a combination thereof.

The auxiliaries may be added at any point in time before, during or after grinding, all at once or in several portions. An auxiliary may, for example, be added by means of a separate jet, by injection into the collision point.

The overall amount of the added auxiliaries may amount to from 0 to 40% by weight, preferably from 1 to 30% by weight, with particular preference from 2.5 to 25% by weight, based on the total weight of the crude pigment and/or prepigment.

Suitable surfactants include anionic or anion-active, cationic or cation-active, and nonionic substances or mixtures of these agents. Preference is given to those surfactants or surfactant mixtures which do not foam in the course of grinding. Examples of suitable anion-active substances include fatty acid taurides, fatty acid N-methyltaurides, fatty acid isethionates, alkylphenylsulfonates, alkylnaphthalinesulfonates, alkylphenol polyglycol ether sulfates, fatty alcohol polyglycol ether sulfates, fatty acid amide polyglycol ether sulfates, alkyl sulfosuccinamates, alkenylsuccinic monoesters, fatty alcohol polyglycol ether sulfosuccinates, alkanesulfonates, fatty acid glutamates, alkyl sulfosuccinates, fatty acid sarcosides; fatty acids, such as palmitic, stearic, and oleic acid; soaps, such as alkali metal salts of fatty acids, naphthenic acids and resin acids, such as abietic acid; alkali-soluble resins, examples being rosin-modified maleate resins, and condensation products based on cyanuric chloride, taurine, N,N'-diethylaminopropylamine, and p-phenylenediamine. Particular preference is given to resin soaps, i.e., alkali metal salts of resin acids.

Examples of suitable cation-active substances include quaternary ammonium salts, fatty amine alkoxylates, alkoxylated polyamines, fatty amine polyglycol ethers, fatty amines, diamines and polyamines derived from fatty amines or fatty alcohols, and their alkoxylates, imidazolines derived from fatty acids, and salts of these cation-active substances, such as acetates, for example.

Examples of suitable nonionic substances include amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers; fatty acid amide ethoxylates, fatty alcohol-alkylene oxide adducts, and alkylphenol polyglycol ethers.

By nonpigmentary dispersants are meant substances which structurally are not derived by chemical modification from organic pigments. They are added as dispersants either during the actual preparation of pigments, or else often during the incorporation of the pigments into the application media to be colored; for example, in the preparation of paints or printing inks, by dispersion of the pigments into the corresponding binders. They may be polymeric substances, examples being polyolefins, polyesters, polyethers, polyamides, polyimines, polyacrylates, polyisocyanates, block copolymers thereof, copolymers of the corresponding monomers; or polymers of one class modified with a few monomers from another class. These polymeric substances carry polar anchor groups such as hydroxyl, amino, imino, and ammonium groups, for example, carboxylic acid groups and carboxylate groups, sulfonic acid groups and sulfonate groups, or phosphonic acid groups and phosphonate groups, and may also be modified with aromatic, nonpigmentary substances. Nonpigmentary dispersants may also, furthermore, be aromatic substances chemically modified with functional groups and not derived from organic pigments. Nonpigmentary dispersants of this kind are known to the skilled worker, and some are available commercially (e.g., Solsperse®, Avecia; Disperbyk®, Byk, Efka®, Efka). Although several types will be mentioned below to give a representation, it is possible in principle to employ any other substances described, examples being condensation products of isocyanates and alcohols, diols or polyols, amino alcohols or diamines or polyamines, polymers of hydroxycarboxylic acids, copolymers of olefin monomers or vinyl monomers and ethylenically unsaturated carboxylic acids or carboxylic esters, urethane-containing polymers of ethylenically unsaturated monomers, urethane-modified polyesters, condensation products based on cyanuric halides, polymers containing nitroxyl compounds, polyester amides, modified polyamides, modified acrylic polymers, comb dispersants comprising polyesters-and acrylic polymers, phosphoric esters, triazine-derived polymers, modified polyethers, or dispersants derived from aromatic nonpigmentary substances. These parent structures are in many cases modified further, by means for example of chemical reaction with further substances carrying functional groups or by salt formation.

By pigmentary dispersants are meant pigment dispersants which are derived from an organic pigment as the parent structure and are prepared by chemically modifying this parent structure; examples include saccharin-containing pigment dispersants, piperidyl-containing pigment dispersants, naphthalene- or perylene-derived pigment dispersants, pigment dispersants containing functional groups linked to the pigment parent structure via a methylene group, pigment parent structures chemically modified with polymers, pigment dispersants containing sulfo acid groups, pigment dispersants containing sulfonamide groups, pigment dispersants containing ether groups, or pigment dispersants containing carboxylic acid, carboxylic ester or carboxamide groups.

The pigment is preferably isolated directly following grinding. However, it is also possible to conduct an aftertreatment (finish) with water and/or an organic solvent, at temperatures for example from 20 to 250° C., with or without the addition of auxiliaries.

It is also possible to evaporate or spray-dry the pigment suspensions present following grinding; in that case, no filtration is necessary.

The preparation of the pigments in accordance with the process of the invention takes place substantially without waste products. The few chemicals may be processed further or completely regenerated.

It was surprising and was not foreseeable that the environmentally unproblematic fine division of pigments would be possible in this simple and technically uncomplicated way through the collision of jets in a microjet reactor, since in accordance with the known processes the fine division of pigments is accomplished only in multistage processes, with considerable environmental or economic burdens, with the production of large amounts of waste products such as salt or dilute acid, and/or with the introduction of unwanted substances into the product as a result of abrasion.

The pigments obtainable in accordance with the present invention are notable for outstanding coloristic and rheological properties; in particular, high flocculation stability, ease of dispersion, good gloss characteristics, and high color strength.

Inventively prepared pigments are suitable for pigmenting natural or synthetic organic materials of high molecular mass, such as cellulose ethers and cellulose esters, such as ethylcellulose, nitrocellulose, cellulose acetate or cellulose butyrate, for example, natural resins or synthetic resins, such as addition-polymerization resins or condensation resins, examples being amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, and polyacrylates, polyamides, polyurethanes or polyesters, rubber, latices, casein, silicones, and silicone resins, individually or in mixtures.

In this context it is unimportant whether the high molecular mass organic compounds mentioned are in the form of plastically deformable masses, casting resins, pastes, melts or spinning solutions, paints, stains, foams, drawing inks, writing inks, mordants, coating materials, emulsion paints or printing inks. Depending on the intended use it proves advantageous to utilize the pigments obtained in accordance with the invention as blends or in the form of preparations or dispersions. Based on the high molecular mass organic material to be pigmented, the pigments prepared in accordance with the invention are employed in an amount of preferably from 0.05 to 30% by weight, more preferably from 0.1 to 15% by weight.

The pigments prepared by the process of the invention may be used to pigment the industrially commonplace baking varnishes from the class of alkyd-melamine resin varnishes, acrylic-melamine resin varnishes, polyester varnishes, high-solids acrylic resin varnishes, aqueous, polyurethane-based varnishes, and also two-component varnishes based on polyisocyanate-crosslinkable acrylic resins, and especially automotive metallic varnishes.

The pigments prepared in accordance with the invention are also suitable for use as colorants in electrophotographic toners and developers, such as one- or two-component powder toners (also called one- or two-component developers), magnetic toners, liquid toners, addition-polymerization toners, and also specialty toners. Typical toner binders are addition-polymerization, polyaddition, and polycondensation resins, such as styrene, styrene-acrylate, styrene-butadiene, acrylate, polyester, and phenol-epoxy resins, polysulfones, polyurethanes, individually or in combination, and also polyethylene and polypropylene, which may contain further ingredients, such as charge control agents, waxes or flow aids, or may be subsequently modified with these additives.

Moreover, the pigments prepared in accordance with the invention are suitable for use as colorants in powders and powder coating materials, especially in triboelectrically or electrokinetically sprayable powder coating materials that are used to coat the surfaces of articles made, for example, of metal, wood, plastic, glass, ceramic, concrete, textile material, paper or rubber.

Typical powder coating resins employed are epoxy resins, carboxyl- and hydroxyl-containing polyester resins, polyurethane resins and acrylic resins, together with customary curing agents. Combinations of resins are also used. For example, epoxy resins are frequently used in combination with carboxyl- and hydroxyl-containing polyester resins. Typical curing components (depending on the resin system) are, for example, acid anhydrides, imidazoles, and also dicyandiamide and its derivatives, blocked isocyanates, bisacylurethanes, phenolic and melamine resins, triglycidyl isocyanurates, oxazolines, and dicarboxylic acids.

Moreover, the pigments prepared in accordance with the invention are suitable for use as colorants in inkjet inks on an aqueous and nonaqueous basis, and also in those inks which operate in accordance with the hotmelt process.

Furthermore, the pigments prepared in accordance with the invention are also suitable as colorants for color filters, both for subtractive and for additive color generation.

EXAMPLES

In order to assess the properties in the coating sector of the pigments prepared in accordance with the present invention, a selection was made, from among the large number of known varnishes, of an alkyd-melamine resin varnish (AM) containing aromatics and based on a medium-oil alkyd resin and a butanol-etherified melamine resin; a polyester varnish (PE) based on cellulose acetobutyrate; a high-solids acrylic resin baking varnish based on a nonaqueous dispersion (HS); and an aqueous, polyurethane-based varnish (PUR).

The color strength and hue were determined in accordance with DIN 55986.

The millbase rheology after dispersion was evaluated on the basis of the following five-point scale:
thin
fluid
thick
slightly set
set Following dilution of the millbase to the final pigment concentration, the viscosity was assessed using the Rossmann viscospatula type 301 from Erichsen.

Gloss measurements were carried out on cast films at an angle of 20° in accordance with DIN 67530 (ASTMD 523) using the "multigloss" gloss meter from Byk-Mallinckrodt.

The solvent fastness was determined in accordance with DIN 55976.

The fastness to overcoating was determined in accordance with DIN 53221.

The average particle diameter $D_{50}$ of the coarsely crystalline crude pigments was determined by means of laser light scattering.

The average particle diameter $D_{50}$ of the pigments in the pigment preparations was determined by graphical evaluation of electron micrographs.

The crystal phase was determined by means of X-ray spectroscopy. The X-ray spectra were recorded using CuKα radiation.

In the preceding text and in the following examples, parts and percentages are each by weight of the substances so described.

Example 1

A 5% aqueous crude P.V.23 pigment suspension is sprayed against itself in a two-jet microjet reactor through the frontally opposed nozzles at a pressure of 3800 bar. The nozzles each have a diameter of 100 μm and the jets meet in the gas space. The suspension is conveyed out of the microjet reactor by means of compressed air. A total of 10 passes are carried out. The pigment is filtered off with suction, washed with water, and dried at 80° C.

What is claimed is:

1. A process for the manufacture of finely divided organic pigments comprising the steps of spraying a coarsely crystalline crude pigment and/or a poorly dispersible prepigment in suspension form through nozzles to a point of conjoint collision in a reactor chamber enclosed by a housing in a microjet reactor to form a pigment suspension, wherein the microjet reactor has a gas entry side and a product and gas exit side, passing a gas or an evaporating liquid into the reactor chamber through an opening in the housing for the purpose of maintaining a gas atmosphere in the reactor chamber, and removing the pigment suspension and the gas or the evaporating liquid from the microjet reactor through a further opening in the housing by means of overpressure on the gas entry side or underpressure on the product and gas exit side.

2. The process as claimed in claim 1, wherein the crude pigment and/or prepigment in suspension is sprayed into the reactor chamber with a pressure of at least 50 bar.

3. The process as claimed in claim 1, wherein the temperature of the crude pigment and/or prepigment in suspension is from −50 to +250.

4. The process as claimed in claim 1, wherein the crude pigment and/or prepigment in suspension consists of not more than 30% by weight, based on the overall weight of the suspension, of crude pigment and/or prepigment.

5. The process as claimed in claim 1, wherein the crude pigment and/or prepigment in suspension comprises an aqueous, aqueous-organic or organic medium.

6. The process as claimed in claim 5, wherein the organic or aqueous-organic medium comprises $C_1$–$C_{10}$ alkanols, glycols, polyglycols, ethers, glycol ethers, ketones, aliphatic acid amides, urea derivatives, cyclic carboxamides, esters, nitriles, aliphatic or aromatic hydrocarbons, aromatic heterocycles, hexamethylphosphoramide, 1,3-dimethyl-2-imidazolidinone, dimethyl sulfoxide, sulfolane, or mixtures of these solvents with one another and/or with water.

7. The process as claimed in claim 1, wherein the crude pigment and/or prepigment in suspension consists of from 0 to 40% by weight, based on the overall weight of the crude pigment and/or prepigment, of one or more auxiliaries selected from the group consisting of the surfactants, non-pigmentary and pigmentary dispersants, fillers, standardizers, resins, waxes, defoamers, antidust agents, extenders, shading colorants, preservatives, drying retardants, rheology control additives, wetting agents, antioxidants, UV absorbers, and light stabilizers.

8. The process as claimed in claim 1, wherein crude pigment and/or prepigment in suspension are selected from the group consisting of perylene, perinone, quinacridone, quinacridonequinone, anthraquinone, anthanthrone, benzimidazolone, disazo condensation, azo, indanthrone, phthalocyanine, triarylcarbonium, dioxazine, aminoanthraquinone, diketopyrrolopyrrole, indigo, thioindigo, thiazineindigo, flavanthrone, isoindoline, isoindolinone, pyranthrone, isoviolanthrone, flavanthrone, anthrapyrimidine, or carbon black pigments and mixed crystals thereof.

9. The process as claimed in claim 1, wherein the gas is air, nitrogen or carbon dioxide.

10. The process as claimed in claim 1, wherein a gas atmosphere is maintained in the vicinity of the conjoint collision.

11. The process as claimed in claim 1, wherein the crude-pigment and/or prepigment in suspension is sprayed to a point of conjoint collision through two or more nozzles.

12. The process as claimed in claim 1, wherein the crude pigment and/or prepigment in suspension is pumped through the microjet reactor in from 1 to 10, passes or wherein the suspension is pumped in circulation through the microjet reactor.

13. The process as claimed in claim 1, wherein the crude pigment and/or prepigment in suspension is sprayed into the reactor chamber with a pressure of from 500 to 5000 bar.

14. The process as claimed in claim 1, wherein the temperature of the crude pigment and/or prepigment in suspension is from 0 to 180° C.

15. The process as claimed in claim 1, wherein the crude pigment and/or prepigment in suspension consists of between 3 to 25% by weight, based on the overall weight of the suspension, of crude pigment and/or prepigment.

16. The process as claimed in claim 1, wherein the crude pigment and/or prepigment in suspension consists of from 1 to 30% by weight, based on the overall weight of the crude pigment and/or prepigment, of one or more auxiliaries selected from the group consisting of the surfactants, non-pigmentary and pigmentary dispersants, fillers, standardizers, resins, waxes, defoamers, antidust agents, extenders, shading colorants, preservatives, drying retardants, rheology control additives, wetting agents, antioxidants, UV absorbers, and light stabilizers.

17. The process as claimed in claim 1, wherein the crude-pigment and/or prepigment in suspension is sprayed to a point of conjoint collision through two nozzles.

18. The process as claimed in claim 1, wherein the crude pigment and/or prepigment in suspension is pumped through the microjet reactor in 1 to 7 passes.

* * * * *